Figure 1:
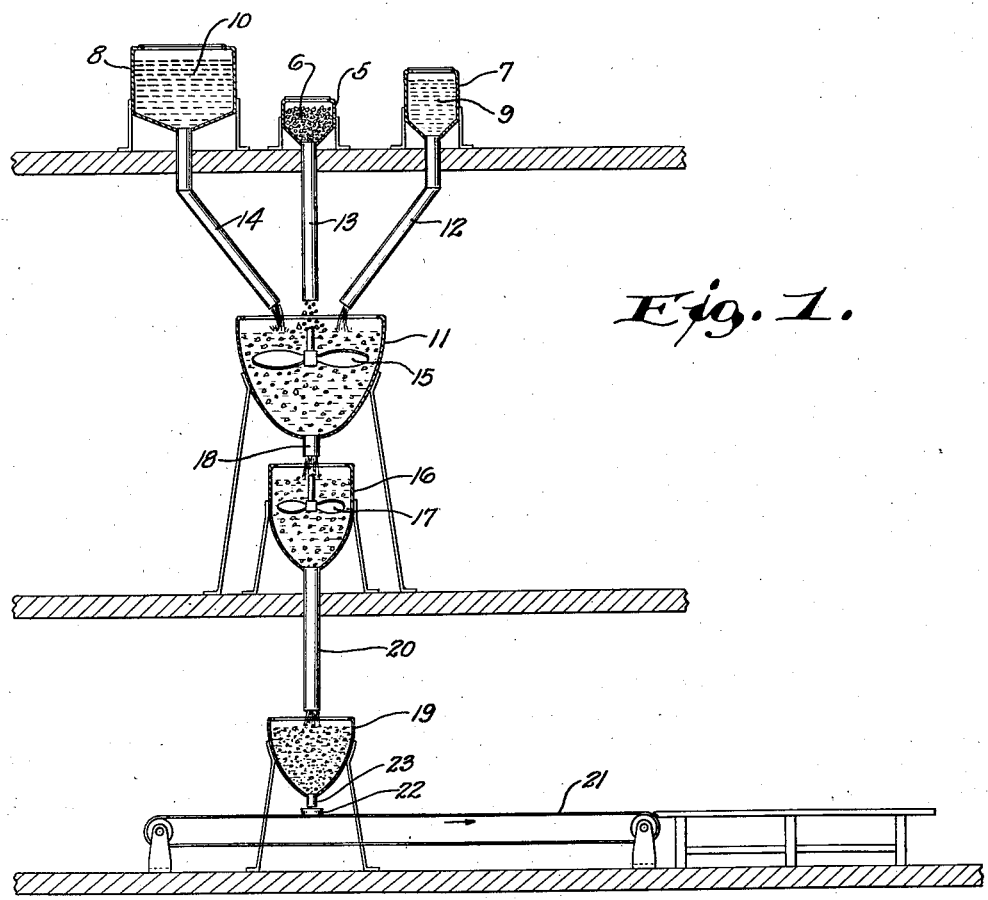

Nov. 28, 1939.  L. J. KELLY ET AL  2,181,239
ART OF PREPARING PICKLED FOOD PRODUCTS
Filed April 14, 1938

INVENTORS
Leslie J. Kelly,
William D. Mueller &
BY  Vernon L. Brunette
Morsell, Lieber & Morsell
ATTORNEYS.

Patented Nov. 28, 1939

2,181,239

UNITED STATES PATENT OFFICE 2,181,239

ART OF PREPARING PICKLED FOOD PRODUCTS

Leslie J. Kelly, William G. Mueller, and Vernon L. Brunette, Green Bay, Wis., assignors to Green Bay Food Company, Green Bay, Wis, a corporation of Wisconsin Application April 14, 1938, Serial No. 201,889

2 Claims. (Cl. 99—144)

This invention relates to improvements in the art of preparing pickled food products, and more particularly to the method of preparing and packing a new and unique form of gelatinous pickled food product for ultimate use by the consumer.

A general object of the invention is to provide an expeditious and commercially practical method of preparing pickled food products susceptible of use on a large scale for commercial operations.

A further object of the invention is to provide a method of preparing a pickled food product which will reach the consumer in the form of a viscous, self-sustaining mold.

A further object of the invention is to provide a pickled food product which has no free liquors therein.

A further object of the invention is to provide an improved method of preparing and packing pickled food products so that the products when used by the consumer will be neat, attractive, and stable in appearance, and by which the product will not deteriorate during storage and before consumption.

Still another specific object of the present invention is to provide a method of preparing pickled food products which is relatively inexpensive, which is simple, and which is commercially practical.

With the above and other objects in view, the invention consists of the improved method of preparing pickled food products, and all its parts, combinations and steps, as set forth in the claims, and all equivalents thereof.

Figure 2:
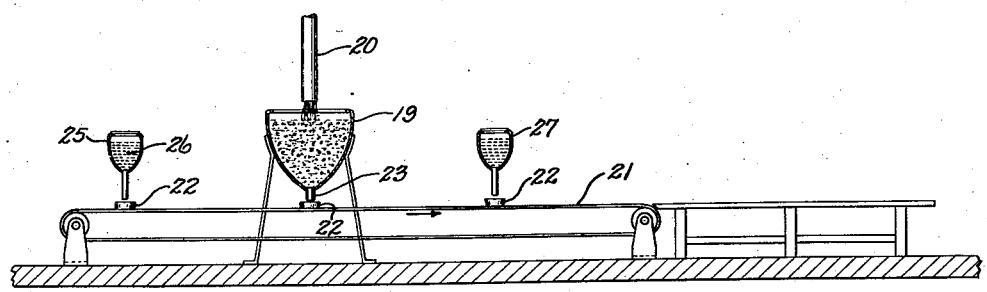

In the accompanying drawing in which the same reference characters indicate the same parts in the several views:

Fig. 1 is a sectional, semi-schematic view of an apparatus for carrying out the improved method of preparing pickled food products; and Fig. 2 is a sectional semi-schematic view of the end portion of the apparatus modified somewhat to permit the preparation of a slightly modified form of pickled food product.

Throughout the specification and in the claims, wherever the term "pickles" or any derivative thereof is used, it is intended that this term implies and includes such food products as cucumbers, cauliflower, pimento, onions, beets, watermelon rind, or any other foodstuffs of a similar nature susceptible of being subjected to a pickling process.

Referring to the drawing, it should be understood that the apparatus shown therein schematically for carrying on the present invention is merely by way of illustration and is susceptible of modification. The base ingredients of the improved pickled food product are any of the pickle materials mentioned above which may or may not be in comminuted form, smaller pieces and particles of this food stuff being desirable when a relish or spread is to be produced. The numeral 5 indicates a hopper or container which is kept filled with an adequate supply of the pickle materials indicated by the numeral 6. Adjacent the hopper or receptacle 5 there are two other receptacles or tanks designated 7 and 8 respectively. The receptacle 7 is adapted to contain and be supplied with an adequate quantity of free juice indicated by the numeral 9, and this free juice is a suitable mixture of vinegar, spices, sugar, and condiments. The container 8 also contains a quantity of a cold liquid designated by the numeral 10 and composed of free juice similar to that in the container 7, only having added to it a suitable quantity of gelatine. The gelatin, in any of its commercial forms, is mixed with the liquid in the tank 8.

The numeral 11 represents a steam jacketed heating kettle disposed wherever convenient so as to have material introduced thereinto in proper sequence from the various containers or tanks 5, 7 and 8. For this purpose the lower ends of said latter receptacles or tanks may have extending therefrom conduits or tubes 12, 13 and 14 whose outer ends open into the kettle 11 so as to discharge, when desired, materials into the kettle 11. Flow through the tubes 12, 13 and 14 may, of course, be controlled by suitable valves or gates.

As before mentioned, the kettle 11 is subjected to heat, and preferably pickle particles from the receptacle 5 and free juice from the tank 7 are first allowed to flow into the kettle 11. By means of a suitable agitator 15 within the kettle, the pickle material is thoroughly mixed with the free juice while these substances are being subjected to heat. During this stage of the operations gums or stabilizers are introduced directly into the mixture in the kettle 11. The gums or stabilizers may be arrowroot flour, or vegetable gums such as Kraya, tragacanth, gum arabic, or combinations of these substances. The gums or stabilizers constitute less than 1% by weight of the total mass. It is also possible that the final food product may be enhanced by having been colored. Where it is desired to produce a specially colored product, suitable coloring matter is added to the mixture in the kettle 11.

The next step is the introduction of the material from the tank 8 which includes gelatin. A suitable amount of this substance is allowed to flow into the kettle 11, and heat is at this point shut off so that the mixture will not be subjected to any further cooking. The agitation through the propeller 15 is continued so as to thoroughly mix all of the materials in the kettle 11. The amount of gelatin actually used constitutes approximately 2% by weight of the total mass.

Arranged in convenient proximity to the kettle 11 is a water jacketed cooling tank 16 also having therein a revoluble agitator or paddle 17. This cooling tank 16 is adapted to receive some of the mixture from the kettle 11 via a spout or conduit 18 which may be controlled by a valve or gate. The mixture within the cooling tank 16 is subjected to substantial agitation and is allowed to remain in the tank until the temperature has been lowered to a certain degree. When the desired cool temperature has been reached, the mixture within the tank 16 may have flavoring matter added thereto if it is contemplated that the final product have a flavor other than that imparted by the natural substances therein which include the pickled food particles and the juice or liquor. Ultimately the food mixture, which is still in a fluent state, is discharged from the cooling tank 16 into the hopper 19 of a container filling machine, the discharge being through a controlled conduit or spout 20. The container filling machine may be of any standard form and has not been illustrated, other than that it includes a driven endless conveyor 21 on which the open containers to be filled, designated by the numeral 22, are intermittently placed and are successively brought under the discharge spout 23 of the filling machine hopper.

The improved pickled food product is introduced into its containers while fluent, and it subsequently congeals and forms within the container, into a final product of mold formation, partaking of the interior shape of the container. It will thus be seen that the ultimate product may be of any desired shape or configuration, depending upon the interior of the container into which it is poured. After the container is filled, it is capped, or closed and sealed so as to render the interior thereof air tight, and it is then in the form in which it is transported to the user, consumer, or vendor. The gelatin in the mixture causes the mixture to congeal into a self-sustaining mass within the container, and it will stay in this condition unless subjected to an unwarranted amount of heat. If the container is subjected to heat, the condition of the product therein can be restored by subjecting the container to cooling or refrigeration. The gums or stabilizers within the mixture maintain the relationship of the food particles within the stock in thoroughly distributed arrangement and prevent displacement of the food particles. It should also be observed that the improved food product may be readily packed in inexpensive paper board containers, and when it is desired to use or consume the product therein, the container may be torn open, and the food product is removed therefrom in neat, molded formation.

The method of preparing the food product is susceptable of many variations, and in Fig. 2 there is illustrated schematically the mechanism at the discharge end of the system, slightly modified, for producing an alternative form of food product. The food product thus produced consists of a molded gelatinous or viscous pickled product exteriorly coated or jacketed by a different edible substance such as cheese. Referring to Fig. 2 it will be noted that adjacent the inner end of the conveyor of the filling machine there is a hopper or supply receptacle 25 which discharges fluent cheese 26 into the open container 22 so as to merely coat or line the inner walls of the container. The container as thus lined is then moved under the discharge spout 23 of the filling machine hopper 19, and the cheese mold thus formed within the container is filled with the gelatinous pickle mixture from the hopper 19. When the container 22 is thus filled, it is moved to another cheese container 27 which supplies a coating of cheese over the top of the pickled material in the container 22 so as to completely encase the pickled product, and thereafter the container is closed, capped, or sealed in the usual manner.

Various changes and modifications may be made in the method without departing from the spirit of the invention, and all of such changes are contemplated as may come within the scope of the claims.

What is claimed as the invention is:

1. The method of preparing a molded food product, which consists in mixing solid, pickle forming food particles with an edible pickling liquor, subjecting the mixture to heat and agitation, during the heating step adding a gummy substance to the mixture and causing portions of the gummy substance to encase the individual food particles, then adding a gelatinous substance to the mixture and immediately cooling the product, and finally pouring the product, while fluent, into containers, which are subsequently sealed and in which the material, all of which is edible, congeals in mold formations.

2. The method of preparing an edible and molded food product, which consists in mixing solid, pickle forming foodstuff with a greater quantity of an edible pickling liquor, subjecting the mixture to heat and agitation, during the heating step adding an edible gummy substance and coloring matter to the mixture, then adding a gelatinous substance to the mixture and immediately cooling the product, after the temperature of the mixture has been substantially reduced adding a flavoring material thereto, and finally pouring the product, while fluent, into containers, which are subsequently sealed and in which the material congeals in mold formations with the congealed liquor predominating.

LESLIE J. KELLY.
WILLIAM G. MUELLER.
VERNON L. BRUNETTE.